Patented Sept. 13, 1932

1,876,880

UNITED STATES PATENT OFFICE

OTHMAR DRAPAL, OF FRANKFORT-ON-THE-MAIN, GERMANY, ASSIGNOR TO GENERAL ANILINE WORKS, INC., OF NEW YORK, N. Y., A CORPORATION OF DELAWARE

IMPROVING THE STABILITY OF DIAZO SOLUTIONS IN THE PRESENCE OF IRON

No Drawing. Application filed December 22, 1928, Serial No. 328,049, and in Germany December 24, 1927.

In preparing the important ice-colors the dyer, when working economically, is obliged to use apparatuses prepared from or containing iron and to dye in a standing diazo bath. The standing bath requires a good stability of the diazo solutions, which stability is much injured by the presence of iron. In this case the diazo solutions are already entirely decomposed after a short time, especially when containing an excess of an acid. Generally the diazo compounds, when in contact with iron in acid solution are inclined to a quick decomposition.

I have now found that the injurious influence of iron can be diminished to a high degree by adding to the diazo solution agents capable of converting ferrous ions into ferric ones and which do not destroy the diazo solution. Nitrous acid is especially suitable for this purpose. My observation is all the more surprising as Schwalbe (Zeitschrift für Farben- und Textil-Industrie, vol. 1905, No. 18) found that nitrous acid has a poisoning action on diazo compounds (page 435, line 10–11) and accelerates in a high degree, like a catalyst, the speed of decomposition (page 433, paragraph 2, line 11–14). Therefore it was not to be foreseen that the addition of nitrous acid would increase the stability of the diazo compounds. It might be rather assumed that the injurious influence of iron on the diazo compound would be raised by the action of nitrous acid.

For technical purposes my process is advantageously carried out by adding nitrous acid to a diazo solution which will be employed in iron apparatus in an amount at least equivalent to the amount of alkali metal nitrite, for example, sodium nitrite, which was originally used to form the diazo solution. The nitrous acid is preferably prepared by adding sodium nitrite to the corresponding amount of a free acid.

In order to illustrate the new process more fully the following examples are given:

*Example 1.*—1.28 grs. of ortho-chloro aniline are dissolved in 3 c. c. of hydrochloric acid of 20° Bé. and water; to this solution 0.75 grs. of sodium nitrite are added. When the diazo compound is formed, the solution is nearly neutralized with 0.85 grs. of sodium acetate and the whole is made up to 1 liter.

A solution of nitrous acid prepared from 1 gr. of sodium nitrite and a dilute formic acid is added to 500 c. c. of this diazo solution, the other 500 c. c. remains without any addition. Then both solutions are exposed to the action of iron under the same conditions at 17–20° C. for 5 hours. Thereafter the content of each solution is examined. The solution which contained originally 1.275 grs. of the base per liter and no nitrous acid now contains 0.468 grs. of the base per liter, that is, 64% of the diazo compound is decomposed. The solution to which the nitrous acid has been added and which contained originally 1.275 grs. of the base per liter, now contains 1.18 grs. of the base per liter, that is, it lost only 0.8% of its original content.

*Example 2.*—A solution of the diazonium chloride of the amino azo body prepared from para-nitraniline and amino hydroquinone dimethyl ether, which solution contains 0.925 grs. of the base per liter and to which 1.1 grs. of crystallized aluminium sulfate have been added, is divided into 2 equal parts, one part being mixed with a solution of nitrous acid corresponding to 2 grs. of sodium nitrite per liter.

Both solutions are subjected at about 18° C. while stirring to the same action of iron and after 1, 2 and 3 hours the degree of decomposition of each is determined by examining the content of the solutions.

The following table shows the degree of decomposition in both solutions:

|  | Solution to which nitrous acid was added | | Solution without addition | |
| --- | --- | --- | --- | --- |
|  | Content grs. per liter | Diminution per cent | Content grs. per liter | Diminution per cent |
| Originally | 0.925 | ----- | 0.925 | ----- |
| After 1 hour | 0.853 | 8 | 0.508 | 45 |
| After 2 hours | 0.807 | 13 | 0.214 | 77 |
| After 3 hours | 0.71 | 23 | 0.0 | 100 |

The aforesaid numbers explain the favorable influence of nitrous acid on the stability of diazo compounds in the presence of iron.

I claim:

1. A method of improving the stability of a diazo solution in the presence of iron which comprises adding nitrous acid to said diazo solution in an amount at least equivalent to the amount of alkali metal nitrite originally used to form the diazo solution.

2. A method of improving the stability of a diazo solution in the presence of iron which comprises adding a solution of an alkali metal nitrite in a corresponding amount of a free acid to said diazo solution the amount of alkali metal nitrite thus added being at least equivalent to the amount of alkali metal nitrite originally used to form the diazo solution.

In testimony whereof, I affix my signature.

OTHMAR DRAPAL.